Dec. 23, 1930.  F. C. FISHER  1,786,058
INDICATOR FOR WEIGHING SCALES
Filed July 17, 1930
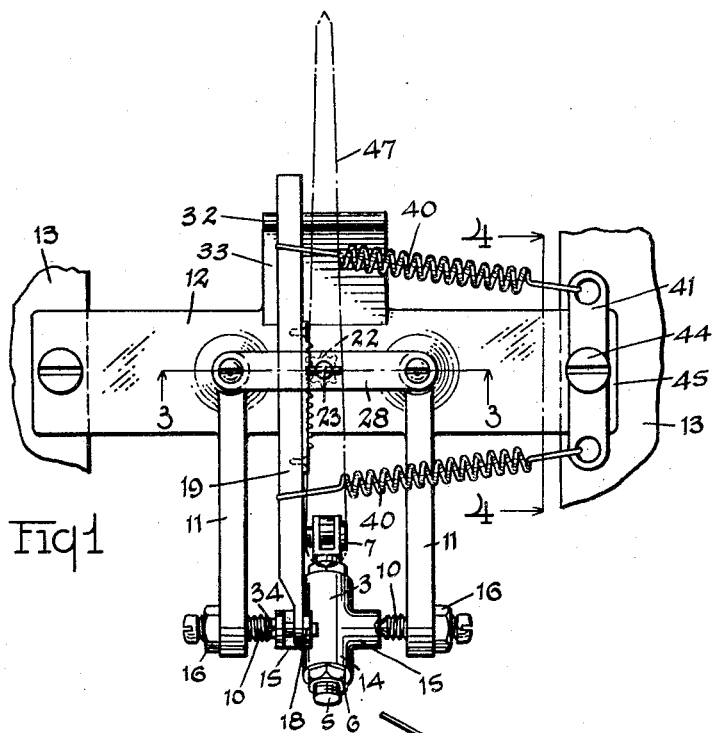
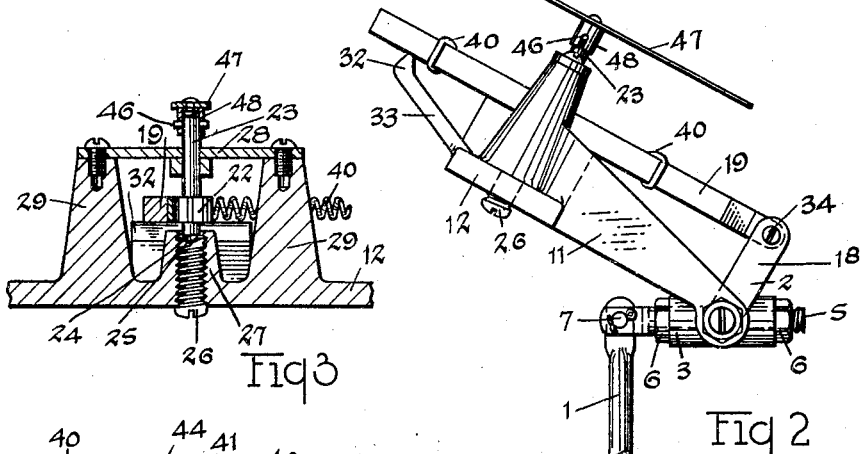
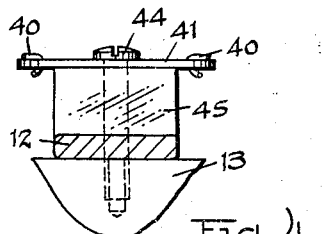
Inventor
Frank C. Fisher
By Faust F. Crampton
Attorney Patented Dec. 23, 1930

1,786,058

UNITED STATES PATENT OFFICE

FRANK C. FISHER, OF TOLEDO, OHIO

INDICATOR FOR WEIGHING SCALES

Application filed July 17, 1930. Serial No. 468,651.

My invention has for its object to provide an improved dial or needle operating mechanism for producing accurate indications of the changes that occur in the actuating force. The invention is particularly applicable to weighing scales and provides a simple and efficient means for transmitting the movement of a member actuated by the load or weight to the indicating part, such as a needle or dial, without loss of pressure occurring by reason of the extended movement of the needle as compared to the movement of the actuating member. As is well known in connection with scale mechanisms, any resistance that occurs in a member that moves over an extended area, counterbalances a large part of the load that is placed upon the scales, with the result that the indication of weight is much less than the actual load placed upon the scales.

By my invention, the friction of operation of the transmission mechanism is very low and the structure is such that the resistance to movement is reduced to a minimum.

The invention may be contained in indicating devices of different forms and, to illustrate a practical application of my invention, the improvement is shown as applied to a weighing scale having a vertical moving member which is interconnected to the levers that cooperate to support the weighing platform, or other load or weight carrying element. The device illustrated is selected as an example of the various constructions to which my invention may be applied. The device referred to is illustrated in the accompanying drawing and is described hereinafter.

Fig. 1 illustrates a top view of the device, the indicating needle being shown in phantom and the dial removed. Fig. 2 illustrates a side view of the device shown in Fig. 1. Fig. 3 illustrates a view of a section taken on the plane of the line 3—3 indicated in Fig. 1. Fig. 4 is a view of a section taken on the plane of the line 4—4 indicated in Fig. 1.

The particular indicating device shown in the drawing is actuated by a suitable member, such as the rod 1, which is connected in any manner to the weighing platform or load carrying member of the scales. The movement of the platform, or similar part of the scale, is transmitted through the rod 1 to the indicating device illustrated in the drawing. It is connected to a bell-crank lever 2 having an adjustable arm 3.

The lever 2 has a sleeve 4 that is located on the threaded pin 5. The pin 5 is adjusted with reference to the sleeve 4 by means of the nuts 6, that are located on the threaded pin 5, and may be operated to adjust the position of the sleeve 3 on the pin 5. The rod or link 1 is connected to the end of the pin 5. The pin 5 may be slotted to receive the end of the rod 1 and provided with a pin 7 for connecting the rod 1 and the pin 5 together. The pin 5, preferably, extends substantially at right angles to the rod 1, whereby vertical movements of the rod 1 will cause angular movements of the lever 2. The lever 2 is pivotally supported by means of the pointed pins 10, located in the arms 11 which protrude from the plate 12. The plate 12 is supported on the frame 13 of the machine and forms the supporting base for the indicating device, or part of the weighing scale. The sleeve 3 is provided with a pair of bosses 15 having conical recesses for receiving the ends of the pin 10. The pins 10 are secured in their adjusted positions with reference to the recessed bosses 15 and the arms 11 by means of the nuts 16.

The lever 2 is provided with an arm 18 which transmits the angular movement of the lever 2 to the rack 19, to produce longitudinal movements of the rack 19 according to the vertical movements of the rod 1 and at the angle to the vertical at which the dial or needle of the scale is located. For easy reading, the dial or needle is located at a slight angle to the vertical and the bell-crank lever 2 is so formed as to transmit the vertical movements of the rod 1 to movements of the rack 19 in a direction inclined to the vertical.

The rack 19 meshes with the pinion 22 which is supported by means of an arbor 23. The arbor is rotatably supported by means of a pointed end 24 that is stepped in a conical recess 25, formed in the end of the threaded pin 26, which is located in the boss 27 formed in the plate 12. The arbor 23 is also supported in the bar 28 which is secured to the upper ends of the pedestals 29 that are located on the plate 12. One end of the rack 19 rides on the rounded edge 32 of a bracket 33 that extends from the body of the plate 12, and the other end is carried by means of the arm 18, of the lever 2, to which it is connected by means of the pin 34.

The upper end of the lever arm 18 is provided with a pair of ears 38 and the end of the rack 19 extends between the ears to allow a considerable play between the ears, that is, the distance between the ears 38 is considerably greater than the thickness of the portion of the rack 19 located between the ears. The rack is loosely connected to the pin 34 to permit free lateral movements and limited angular movements of the rack in a horizontal direction along and on the pin 34. Means is provided for very lightly pressing the rack towards the pinion. Spring means is provided to operate against the rack to press the rack in a horizontal direction. A spring 39 barely touching the rack when one side of its end portion is located against one of the ears 38, is located on the pin 34 which maintains the rack in position. Also, preferably, a light spring means engages the rack on opposite sides of the pinion. A pair of light tension springs 40 may be located substantially in the plane of the rack. They are connected to the ends of the centrally pivoted bar 41 and to the rack 19 at points preferably located substantially equi-distant from the pinion 22 when the rack is in a position with reference to the axis of the pinion due to a weight placed on the scale that is equal to the average of the usual weights that are to be weighed. For instance, where individuals are to be weighed, a certain average of such individuals will be estimated and the rack is placed with respect to the axis of the pinion to locate the rack in the position as described. Also, where articles having substantially uniform weight, or which weigh within certain high and low limitations, the rack is likewise preferably located with reference to the axis of the pinion to locate the pinion at the midpoint when a weight, equal to the average, is placed upon the load supporting member of the scale. However, this may be varied and unless there is a definite average of weights to be weighed by the scale, the pinion is located at the midpoint of the high and low limit of the scale, or the midpoint between the zero weight and the high limit of the scale may be taken as the average weight that is to be weighed by the scale and the rack may be located, with respect to the pinion, accordingly.

The springs 40 operate to draw the rack, which is freely movable on the pin 34 and the rounded edge 32, towards the pinion. The springs 40, being located in the plane of the rack and the plane of the bar 41, operate to maintain a substantially constant pressure as the rack 19 is shifted by the operation of the rod 1 and prevents any change of pressure as between the teeth of the rack and of the pinion due to changes in position. Furthermore, as the rack 19 is shifted, with respect to the axis of the pinion, the pressure of the springs change. For example, the lower spring 40 will, normally, decrease in pressure when the rack 19 is raised, that is, when it is shifted upward in its inclined position with reference to the vertical rod 1. The upper spring 40 would be subjected to an increased tension if the bar 41 were held rigid. The bar 41, however, being pivotally supported by means of the pin 44, the boss 45 is supported on the plate 12. The bar 41 will move angularly in the plane of the rack 19 to adjust itself to the changes in tension of the springs 40, that would otherwise occur, if the bar 41 were rigidly held in the position shown in Fig. 1. Thus the decrease in tension of the lower spring 40 permits the upper end of the bar 41 to swing on the pin 44 and decrease the tension of the upper spring 40. This change in tension is very slight. The springs 40 are very light tension springs and the bar 41 is located remote from the rack to reduce the angle of the movement of the springs 40. The rack, springs, and the bar 41, are, preferably, located in the same plane. Consequently, the rack 19 may be said to float with reference to the pinion 22, and its point of connection with the lever 2, and so as to produce very light pressures against the pinion and against the end of the arm 18 and yet maintain the pressure of the rack against the pinion substantially constant. The upper end of the arbor 23 is provided with a cross pin 46 and the needle 47 is provided with a socket 48 that fits the upper end of the arbor 23 and so as to engage the pin 46. Thus the needle 47 will be moved with the pinion 22 which is accurately responsive to the changes in the pressure of the weight placed upon the load carrying member of the scale.

I claim:

1. In an indicator, an actuating member, a rack, an adjustable lever interconnecting the actuating member and the rack, one end of the rack supported by the lever, a bracket having a rounded edge for slidably supporting the other end of the rack, a pinion operated by the rack, and a pair of tension springs connected to the rack at points substantially equi-distant on opposite sides of the axis of the pinion, and means for subjecting the springs to a tension to press the rack against the pinion.

2. In an indicator, an actuating member, a rack, an adjustable bell-crank lever interconnecting the actuating member and the rack, one end of the rack supported by the lever, a bracket having a rounded edge for slidably supporting the other end of the rack, a pinion operated by the rack, a pair of tension springs connected to the rack at points substantially equi-distant on opposite sides of the axis of the pinion, a bar, means for pivotally and centrally supporting the said bar, the springs being connected to the ends of the bar and to the rack at points on opposite sides of the pinion and substantially equi-distant from the axis of the pinion, the rack, the springs and the bar located in substantially the same plane and the axis of rotation of the bar located substantially at right angles to the plane.

3. In an indicator, an actuating member, a rack, an adjustable lever interconnecting the actuating member and the rack, one end of the rack supported by the lever, a bracket having a rounded edge for slidably supporting the other end of the rack, a pinion operated by the rack, and a pair of tension springs connected to the rack at points substantially equi-distant on opposite sides of the axis of the pinion.

4. In an indicator, an actuating member, a rack, an adjustable lever interconnecting the actuating member and the rack, one end of the rack supported by the lever, a pinion operated by the rack, a pair of tension springs connected to the rack at points substantially equi-distant on opposite sides of the axis of the pinion, an automatic means for varying the tension of the springs as the rack moves over the pinion.

5. In an indicator for weighing scales, an actuating member, an adjustable lever connected to the actuating member, a rack connected to the lever, a pinion meshing with the rack and rotated by the movement of the rack, an automatically adjustable spring means located in the plane of the rack and connected to the rack for pressing the rack with a constant light yielding pressure at all positions of the rack with reference to the pinion, and an indicating member connected to the pinion.

In witness whereof I have hereunto signed my name to this specification.

FRANK C. FISHER.